Aug. 16, 1960 K. C. HALLIDAY, JR 2,949,006
IGNITION SYSTEM FOR ROCKET MOTORS
Filed Jan. 14, 1955
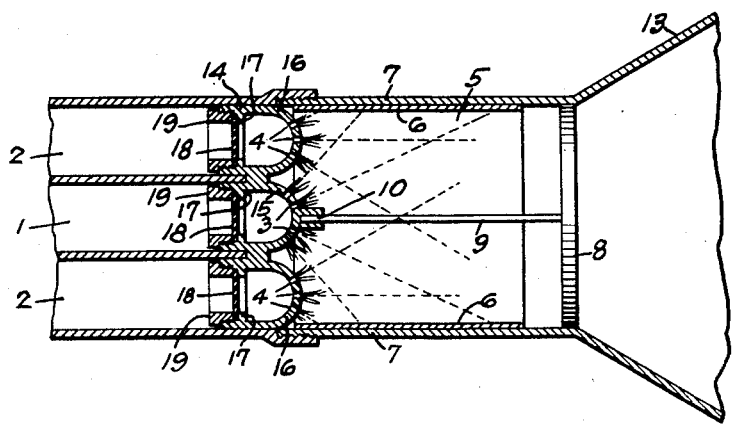
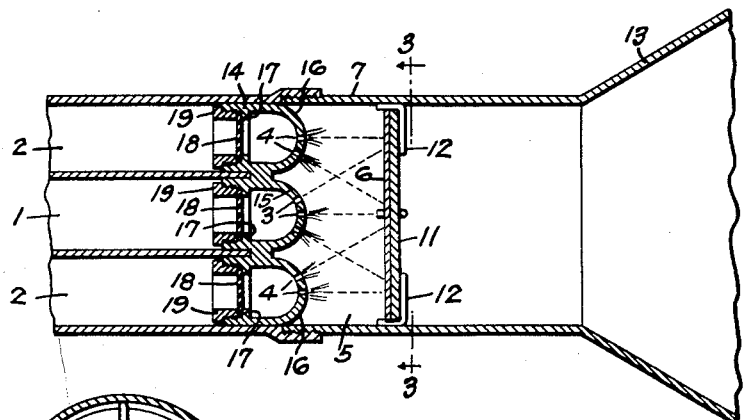
INVENTOR.
Kenneth C. Halliday, Jr.
BY W. E. Thibodeau, A. W. Dew
and A. J. Plantamura ATTORNEYS

United States Patent Office 2,949,006
Patented Aug. 16, 1960

2,949,006

IGNITION SYSTEM FOR ROCKET MOTORS

Kenneth C. Halliday, Jr., Port Washington, N.Y., assignor to the United States of America as represented by the Secretary of the Army Filed Jan. 14, 1955, Ser. No. 481,981

7 Claims. (Cl. 60—35.4)

This invention relates to ignition of fuel mixtures for rocket motors and more particularly to the ignition of non-hypergolic fuel mixtures for rocket motors using auxiliary chemical means.

The starting of bi-propellant rocket motors is generally a matter of considerable difficulty because the ignition of chemicals used in such rocket motors generally requires the provision of extra starting energy, called the energy of activation of the chemical system. There are two main liquid bi-propellant rocket systems in general use. One type uses what are known as "hypergolic" fuels, which are chemically ignited, and the other type uses non-hypergolic fuels which are ignited by external energy i.e. spark plug, powder trains, fuses, flame lance, etc. In the first mentioned type, the fuel must be highly reactive chemically and as a consequence any leakage, spillage or damage to its container may result in a serious fire, if not a bad explosion. The second type (non-hypergolic), which is capable of using such fuels as alcohol, gasoline, kerosene, etc., requires a complex auxiliary starter, as for example power for spark plug, powder trains, fuses, complex internal charge mechanisms, etc., and is less desirable from the standpoint of simplicity of overall operation and weight factors. It is the object of the present invention to provide a chemical-mechanical ignition system of comparative simplicity for igniting non-hypergolic fuels. More particularly, it is the object of this invention to provide a system combining the desirable features of systems utilizing non-hypergolic fuels with the simplicity of those systems involving the chemical ignition of hypergolic type fuels.

The functioning of liquid bi-propellant rockets is chemically accomplished during two main time sequences, known as the "ignition" period and as the "combustion" period. In the case of hypergolic fuels, a sequence of liquid phase reactions generally precedes and introduces the ignition phase; these reactions provide the activation energy necessary to initiate gas combustion phase. Non-hypergolic fuels, on the other hand, use volatilized fuels (for example as in the usual internal combustion engine, with carburization) and the gas phase combustion occurs when energy of activation is obtained through the spark plug, etc. As a practical matter, once combustion has started, the consequential exothermic heat energy will provide activation for incoming propellants and the overall system becomes self-sustaining; consequently a continuous sparking or liquid chemical ignition is not essential. The method of igniting non-hypergolic fuels (such as gasoline) by forerunning a relatively small amount of a liquid hypergolic fuel (such as furfuryl alcohol) into the combustion chamber is known, but such a system is mechanically complex (requiring elaborate valving, etc.) and has proved not too satisfactory.

Heretofore, this method has always necessitated the use of liquid hypergoles which could be pumped or otherwise injected into the combustion chamber. I have now discovered, however, that it is not necessary that the hypergolic substance employed for ignition be of such a highly fluid nature so that it may be injected into the combustion chamber. Instead I have found that combustion activation energies can be obtained by using non-fluid hypergolic substances in the form of organic glasses, amorphous solids, or true solids. Thus, if a non-fluid or semi-fluid hypergolic material is placed within a combustion chamber in such a manner as to be in direct line of contact with a non-hypergolic fuel-oxidizer mixture being injected into the combustion chamber, the hypergolic material will ignite and promote combustion of the non-hypergolic fuel. This hypergolic material is preferably a non-fluid polymerization product of a catechol and a pyridine derivative and may be present in the combustion chamber in the form of a varnish or coating on a fuel contact member. Examples of polymeric substances which have produced good results are polymerization products of allyl catechols and tetramethyl dihydro pyridine; allyl catechols and 2-amino 3-methyl pyridine, tetramethyl dihydro pyridine and pyro catechol or n-hexane and pyro catechol. Accordingly using a rocket motor combustor having any suitable arrangements by which the jets of nitric acid and fuel may intimately commingle and impinge upon the surface having a non-fluid hypergole substance of the type referred to above, I have obtained combustion of non-hypergolic fuel-nitric acid propellants. Comparably more desirable results have been achieved by use of a rocket motor combustor of the splash plate type hereinafter more fully described.

The foregoing and other features of my invention will be better understood from the following description and accompanying drawing in which;

Figure 1 shows a cross-sectional arrangement of a rocket motor combustion system with the organic hypergolic varnish applied to the inner periphery of the combustion chamber.

Figure 2 shows a rocket motor system with the hypergolic varnish applied to a splash plate arrangement.

Figure 3 is a view taken along lines 3—3 of Figure 2 showing the splash plate.

This three component system of oxygen carrier, non-hypergolic fuel and a substantially non-fluid chemical ignitor, which contemplates the use of semi-solid or solid igniters, more desirably those igniters having a viscosity greater than about 250 centistokes at 70° F., is considered a preferred feature of the present invention. The mechanical design of the injector arrangement and combustor is not critical to the operability of the invention. The scope of the invention however is directed particularly to the type systems wherein the hypergole is contained in the combustion chamber as distinguished from a system wherein the hypergole enters the combustion chamber through an injector and then mixes with the fuel.

Novelty in the present invention further resides in utilization of non-fluid hypergoles which cannot easily be pumped for efficient and practical operation. The present invention further contemplates the use of a viscous, semi-solid or solid hypergole as distinguishel from fluid substances which even though feasible for temporary starts would have a tendency to run out of the combustion chamber and would be uncertain in operation after long periods of storage.

The chemical combinations used as hypergolic substances in the present invention are glassy semi-solids, as applied in the rocket motor, and will develop flame points, when wetted with nitric acid, sufficient to cause over-all ignition of volatile hydrocarbon fuels such as normally do not ignite with nitric acid alone. The chemical mixtures referred to as solid ignitors are capable of similar use; considerable variations with respect to ingredients, provide those chemical and physical characteristics most conductive to the fuel used and conditions of use.

In accordance with the present discovery I have found that by providing, in operative relationship to the combustion chamber, a member having a surface composed of these non-fluid substances, and bringing suitable fuel mixtures into contact therewith, ignition may be initiated with the development of sufficient activation energy such that the combustion chamber thereafter is maintained at operative temperature level.

Referring more particularly to the drawing numerals 1 and 2 show the acid tank and fuel space or tube and 3 and 4 the propellant metering orifices, for acid and fuel respectively. The combustion chamber or combustor is indicated by the numeral 5. The hypergolic organic varnish of the present invention is indicated by the numeral 6. The varnish as used to the arrangement of Figure 1 is applied either directly on the surface of the wall 7 of the combustion chamber or in some similar manner as for example upon the surface of a cylindrical sleeve (not shown) which may be assembled within the combustor prior to use. A blow-out plug 8 fastened in a suitable manner as at 10 by means of the strut 9 is so constructed as to be blown out through the exhaust nozzle 13 upon generation of a predetermined pressure in the combustion chamber 5.

In Figure 2 the hypergolic varnish 6 is shown applied to the surface of simple splash plate 11; in this arrangement the splash plate may also function as the blow out plug which is thrust out the nozzle when sufficient combustion pressure has built up to permit release of the plate retaining means 12. As shown, the orifices 3 and 4 are so designed and arranged as to commingle the fuel with the acid and concurrently impinge the propellant upon the hypergolic varnish surface. In the arrangement shown, the tank 1 and fuel tube 2 are provided with an integral closure piece 14 comprising a central dome shaped acid nozzle 15 communicating with the tank 1 and a plurality of concentric equally spaced dome shaped fuel nozzles 16 in communication with the tube 2. The nozzles, 15 and 16, are provided with a seat 17 for a frangible, or otherwise penetrable, diaphragm or seal 18 which is held against the seat 17 by a hollow screw plug 19. In use, the liquid tanks are appropriately pressurized; the fuel and acid passes through the diaphragm and is injected by the nozzles 15 and 16 into contact with the hypergolic varnish 6.

The present invention is described in connection with a nitric acid fuel propellant system but it is obvious that any other non hypergolic combination of an oxidizer and a fuel would be equally suitable. Various liquid fuels, which are ordinarily non-hypergolic without the aid of supplemental hypergolic substances, have been found satisfactory. It will be obvious that normally hypergolic fuels which have been "diluted" with other fuels such as to render them non-hypergolic are also adaptable for the advantageous uses of the present invention.

The following are examples illustrative of the varnish type hypergoles that has been successfully used with nitric acid for ignition of non-hypergolic fuel.

*Example I.*—The splash plate area of a rocket motor was painted with the polymerization product of 2,2,4,6-tetramethyl di-hydro pyridine (tetrapyre) (30 mol percent) and allyl catechol (70 mol percent). The fuel tube 2 was loaded with a fuel mixture of 50% pentene-50% pentane and injected into the combustion chamber at 3–4 p.s.i. simultaneously with nitric acid oxidizer from tank 1. A rapid ignition resulted.

The following mixtures shown in Table A in the proportions given for the system of Example I, i.e. of tetrapyre and allylcatechol, proved successful.

*Table A*

| Mol Proportion | | Result |
|---|---|---|
| Tetrapyre | Allyl-catechol | |
| 1 | 9 | fast flame. |
| 2 | 8 | Do. |
| 3 | 7 | Do. |
| 4 | 6 | slightly less rapid flame. |
| 5 | 5 | Do. |
| 6 | 4 | Do. |
| 7 | 3 | fast flame. |
| 8 | 2 | Do. |
| 9 | 1 | Do. |

*Example II.*—The surface area of the combustor upon which the jets of fuel and oxidizer impinged was coated with the polymerization product of 2,2,4,6-tetramethyl dihydro pyridine and di-allyl catechol in a ratio of 50 mol percent of each and a fuel mixture of petroleum ether and nitric acid injected upon the coated surface of suitable pressure. A satisfactory ignition resulted.

The procedure of Example II was repeated five additional times; each resulted in a successful start.

A successful chemical ignitor was also found in the polymerization product of 2-amino 3-methyl pyridine and allyl catechol. A summary of experimentation with this substance using various proportions of the ingredients to form the polymerization product is shown by Table B.

*Table B*

| Mol Proportion | | Result |
|---|---|---|
| 2 amino 3 methyl pyridine | Allyl Catechol | |
| 1 | 9 | red flame. |
| 2 | 8 | small initial flame. |
| 3 | 7 | small initial flame and vapor flash. |
| 4 | 6 | Do. |
| 5 | 5 | Do. |
| 6 | 4 | small initial flame. |
| 7 | 3 | smoky flame. |
| 8 | 2 | Do. |
| 9 | 1 | Do. |

The chemical substance referred to as "tetrapyre" is a commercially available pyridine derivative more fully identified as 2,2,4,6-tetramethyl 1,2-dihydro pyridine. It is unique in its ease of oxidation and absorbs oxygen so rapidly from the air that rags dampened with it may spontaneously ignite. Successful results have also been attained with isomers of tetrapyre.

Another substance which was used successfully in this work on auxiliary chemical ignitors is the substance known commercially as pentaprim. It is identified structurally as 2,2,4,6,6-penta-methyl tetrahydro pyrimidine.

The results of experiments conducted with other polymerized hypergolic igniters using various non-hypergolic fuels are listed in Table C wherein is shown the mol percentage of the components used to form the polymerization product.

Table C

| Hypergole | | Mol Percent | Condensation Temperature, °C. | Ignition |
|---|---|---|---|---|
| III | {tetrapyre<br>{pyrocatechol | 25<br>100 | 100 | Successful. |
| IV | {pentaprim<br>{pyrocatechol | 25<br>100 | 120 | Successful. |
| V | {pyrrolidine<br>{pyrocatechol | 25<br>125 | 116 | Successful. |
| VI | {pyrrole<br>{pyrocatechol | 25<br>100 | 113 | Successful (with sparking). |
| VII | solid pyrocatechol | | | Successful (with sparking). |
| VIII | {allyl amine<br>{pyrocatechol | 25<br>100 | | Successful (with sparking). |
| IX | {cumidine<br>{pyrocatechol | 25<br>100 | | Successful (slightly slower start). |

The invention has been described in connection with gasoline and petroleum ether as the fuel in the nitric acid fuel system, however, the invention is useful in connection with other well known non-hypergolic hydrocarbon fuels as well as with those hydrocarbon fuels such as the alkyl benzenes and petroleum ether which, despite their more reactive nature, are still not adequately active of themselves to serve as hypergolic fuels.

The following are additional hydrocarbons which may be used as the fuel component in the nitric acid-fuel system, either alone or mixed in such proportions, as not to compound a fuel sufficiently active to spontaneously ignite under normal conditions without the auxiliary chemical igniters of the present invention:

Pentanes, hexanes, heptanes, octanes, decanes, pentene, hexene, octene, benzene, toluene xylenes, ethyl benzenes, isopropyl benzene, vinyl benzenes, cyclohexane, tetralin dekalin, vinyl-cyclo-hexene, di-pentene methylol and pinene.

It will be apparent to those skilled in the art that variations in reactants, proportions, and conditions may be made without departing from the scope of the present invention.

What I claim is:

1. The method of initiating the combustion of a non-hypergolic hydrocarbon fuel nitric acid mixture which comprises injecting said mixture onto the splash contact surface of a rocket motor combustor said contact surface having applied thereon an organic hypergole formed by the polymerization of allyl catechol and 2-amino 3-methyl pyridine.

2. The method of employing a substantially non-fluid organic hypergole having a viscosity of greater than about 250 centistokes at 70° F. for initiating the ignition of non-hypergolic hydrocarbon fuels comprising applying said hypergole to the contact surface of a reaction motor combustor and impinging jets of a non-hypergolic hydrocarbon fuel nitric acid oxidizer onto said hypergole, said hypergole consisting of the polymerization product of a catechol selected from the group consisting of allyl catechol, diallyl catechol and pyrocatechol and a compound selected from the group consisting of tetramethyl dihydro pyridine, pentamethyl tetrahydro pyrimidine, pyrrole, pyrrolidine, cumidine, allyl amine and 2-amino-3-methyl pyridine.

3. The method of initiating the combustion of a mixture of a non-hypergolic hydrocarbon fuel and nitric acid which comprises injecting said mixture onto the surface area of a rocket motor combustor said surface area having applied thereon an organic varnish hypergole formed by the polymerization of diallyl catechol and 2,2,4,6-tetramethyl 1,2-dihydropyridine.

4. The method of claim 3 wherein the proportion of diallyl catechol to 2,2,4,6-tetra methyl 1,2-dihydro pyridine is 50 mol percent of each.

5. The method of claim 3 wherein the proportion of diallyl catechol to 2,2,4,6-tetracethyl 1,2-dihydro pyridine is a 50 mol percent of each and said non-hypergolic fuel consists essentially of petroleum ether.

6. The method of initiating the combustion of a non-hypergolic hydrocarbon fuel-nitric acid oxidizer mixture which comprises contacting said mixture with a non-fluid organic hypergole formed by the polymerization of a catechol selected from the group consisting of allyl catechol, diallyl catechol and pyrocatechol and a member of the group consisting of tetramethyl dihydro pyridine, pentamethyl tetrahydro pyrimidine, pyrrole, pyrrolidine, cumidine, allyl amine, and 2 amino 3 methyl pyridine.

7. The method of initiating the combustion of a non-hypergolic hydrocarbon fuel mixture which comprises placing the compound, formed by the polymerization of a catechol selected from the group consisting of allyl catechol, diallyl catechol and pyrocatechol and a compound selected from the group consisting of tetramethyl dihydro pyridine, pentamethyl tetrahydro pyrimidine, pyrrole, pyrrolidine, cumidine, allyl amine and 2-amino-3-methyl pyridine in a combustion chamber, and injecting the non-hypergolic hydrocarbon fuel-nitric acid oxidizer mixture into the combustion chamber, said hypergolic, polymerization compound being positioned in such a manner within the combustion chamber as to be in line of contact with the non-hypergolic fuel-oxidizer mixture being injected therein whereby upon contact with the oxidizer the non-fluid hypergole will ignite and promote the combustion of the non-hypergolic fuel.

References Cited in the file of this patent

UNITED STATES PATENTS

| 2,433,943 | Zwicky et al. | Jan. 6, 1948 |
| 2,673,069 | Carpenter | Mar. 23, 1954 |
| 2,791,883 | Moore et al. | May 14, 1957 |